J. H. HARVEY.
VEHICLE WHEEL.
APPLICATION FILED DEC. 17, 1908.
978,289.
Patented Dec. 13, 1910.
3 SHEETS—SHEET 1.
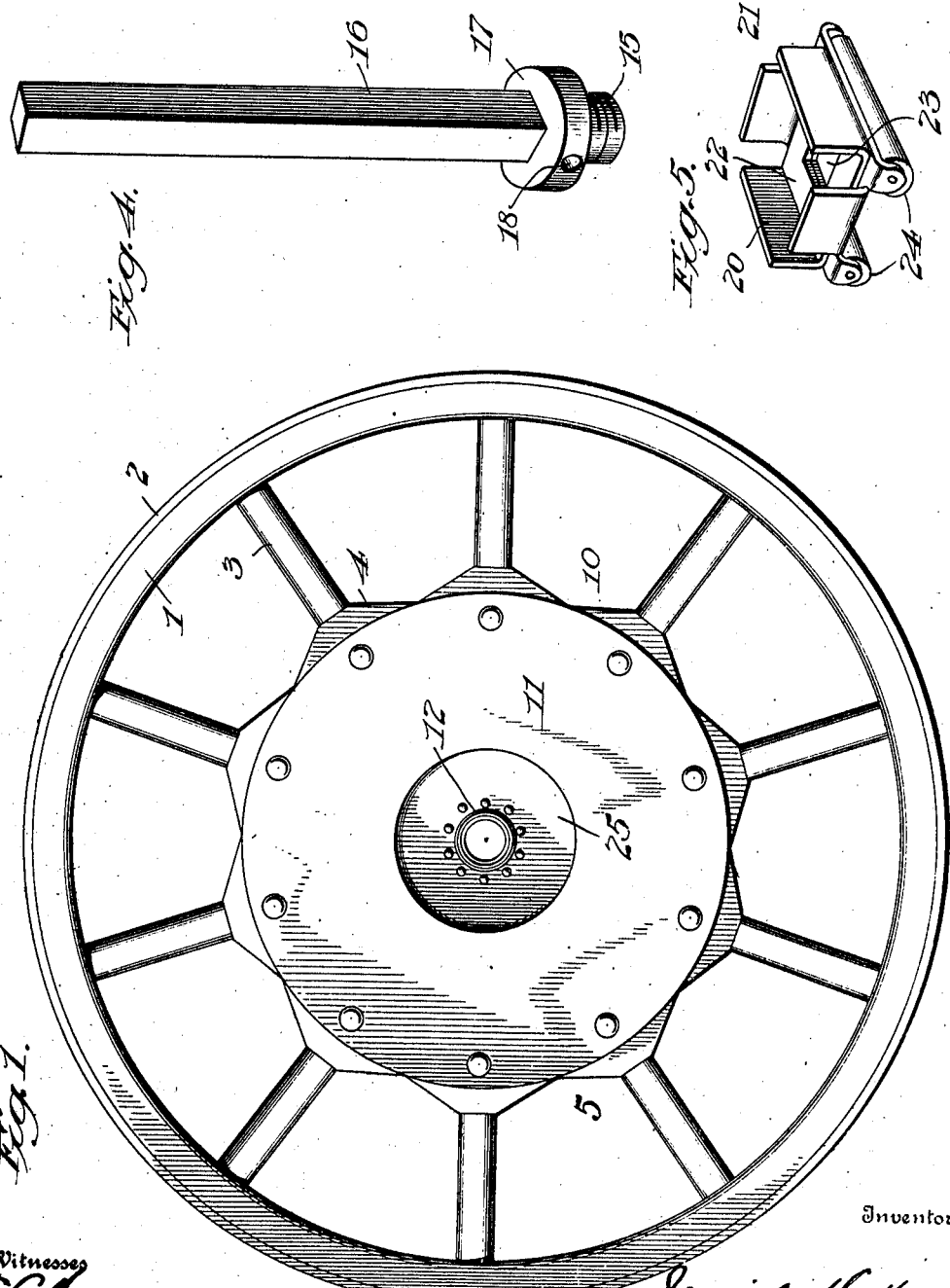

J. H. HARVEY.
VEHICLE WHEEL.
APPLICATION FILED DEC. 17, 1908.
978,289.
Patented Dec. 13, 1910.
3 SHEETS—SHEET 2.
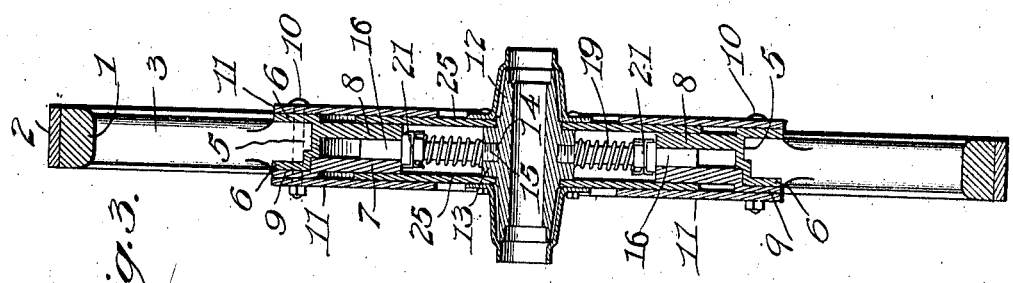
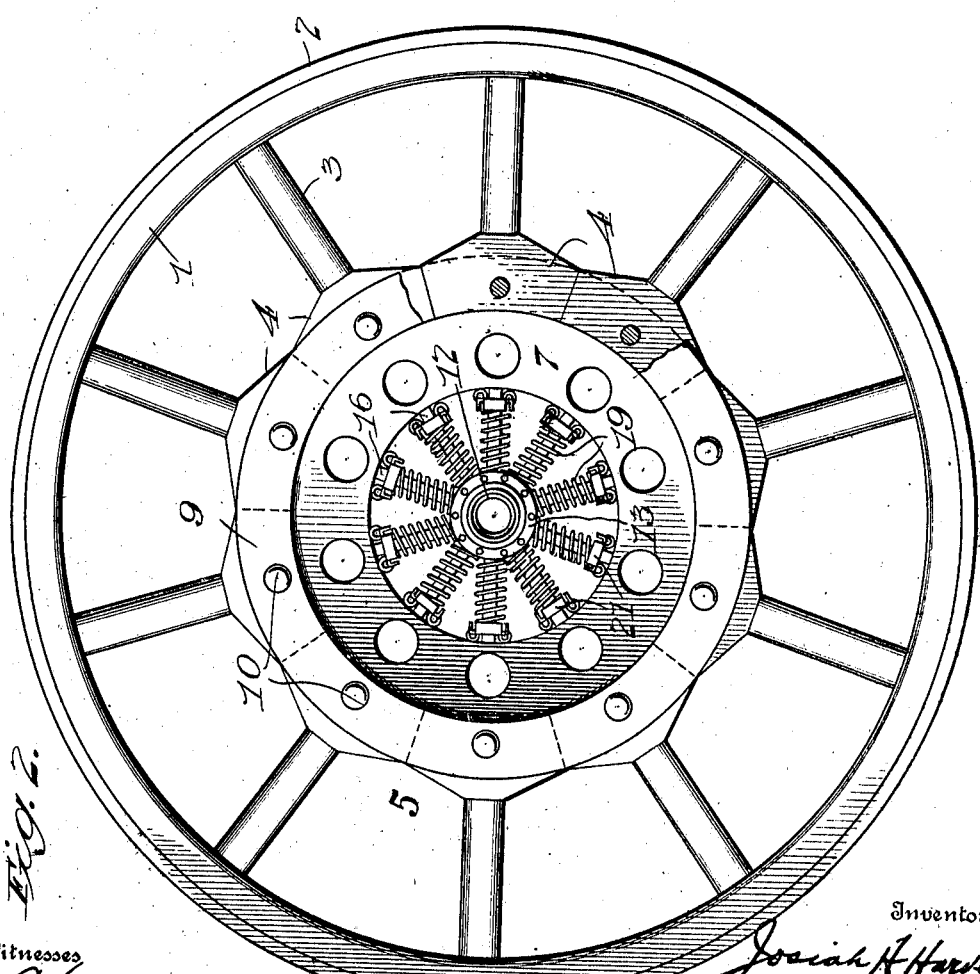
Witnesses
Robert N. Jones
Inventor
Josiah H. Harvey
By
Attorney J. H. HARVEY.
VEHICLE WHEEL.
APPLICATION FILED DEC. 17, 1908.
978,289.
Patented Dec. 13, 1910.
3 SHEETS—SHEET 3.
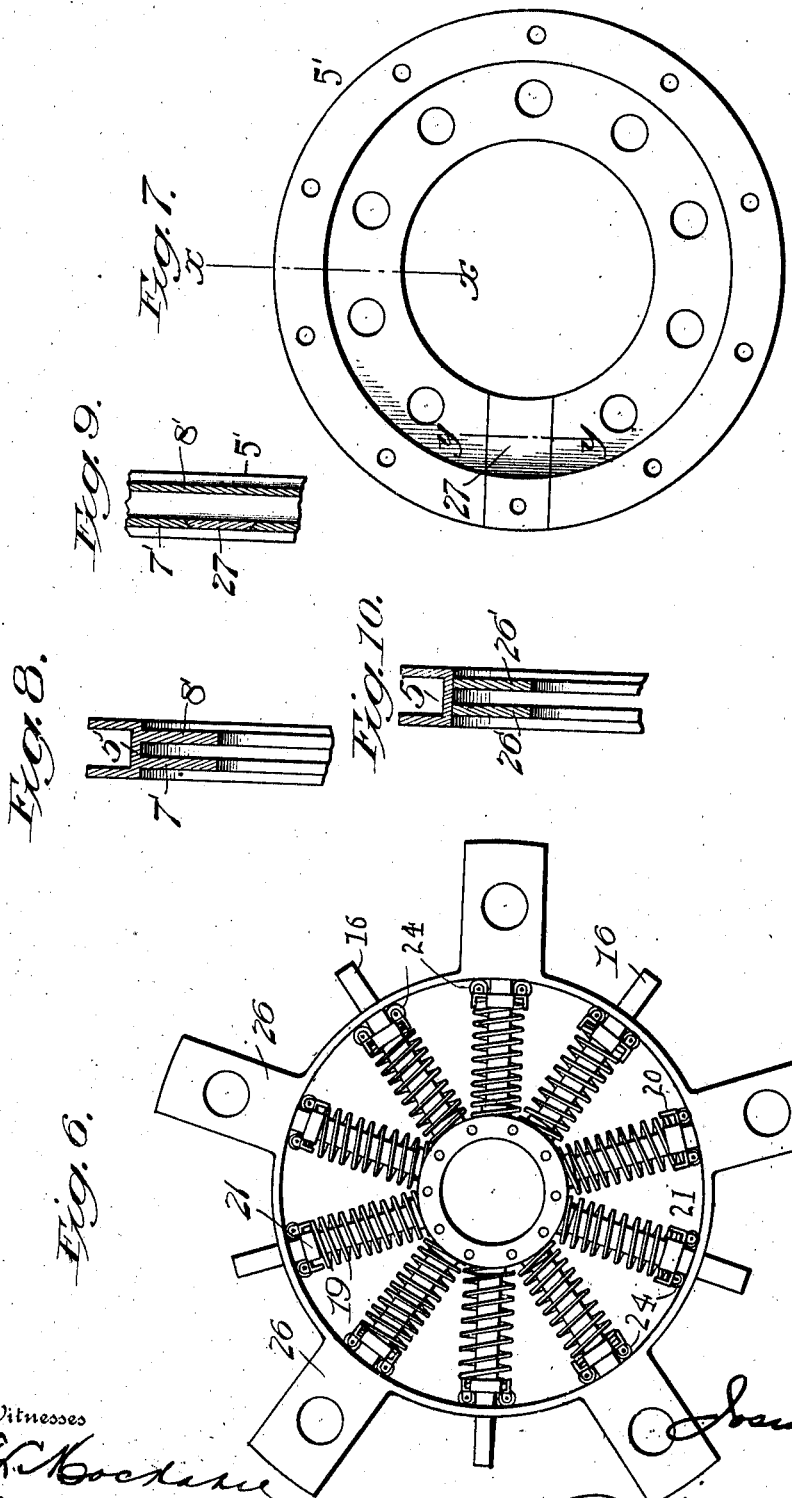
Witnesses
Inventor

UNITED STATES PATENT OFFICE.

JOSIAH H. HARVEY, OF SCRANTON, PENNSYLVANIA.

VEHICLE-WHEEL.

978,289.  Specification of Letters Patent.  Patented Dec. 13, 1910.

Application filed December 17, 1908. Serial No. 467,959.

*To all whom it may concern:*

Be it known that I, JOSIAH H. HARVEY, a citizen of the United States, residing at Scranton, in the county of Lackawanna and State of Pennsylvania, have invented new and useful Improvements in Vehicle-Wheels, of which the following is a specification.

This invention relates to wheels, the object of the invention being to provide a useful, novel, practical and efficient wheel for vehicles in which provision is made for absorbing the jars and vibrations imparted to the wheels in traveling over a rough surface and preventing the communication of such jar and vibration to the axles, running gear and body of the vehicles, the wheel embodying two hubs, normally concentric, which are movable relatively to each other, the arrangement being such that the hubs of the wheel are yieldingly sustained in concentric relation to each other and yet capable of a perfectly free sliding and relative rotative movement.

With the above and other objects in view, the nature of which will more fully appear as the description proceeds, the invention consists in the novel construction, combination and arrangement of parts as herein fully described, illustrated and claimed.

In the accompanying drawings:—Figure 1 is a side elevation of a complete wheel embodying the present invention. Fig. 2 is a similar view with the adjacent side plates removed, showing the interior hubs and cushioning arrangement. Fig. 3 is a diametrical section through the wheel. Fig. 4 is an enlarged detail view of one of the arms of the hub next to the axle. Fig. 5 is a detail perspective view of one of the runners. Fig. 6 is a side elevation, showing the spring arrangement and a modified form of track. Fig. 7 is a side elevation of one of the tracks having a removable section. Fig. 8 is a detail cross section through the hub which is fixed to the felly and tracks on the line $x$—$x$ of Fig. 7, showing the same constructed integrally. Fig. 9 is a detail cross section on the line $y$—$y$ of Fig. 7. Fig. 10 is a section similar to Fig. 8, showing the tracks and outer hub formed separately.

Referring to the drawings, 1 designates the outer rim or felly of the wheel which may be provided with a tire 2 of any usual or suitable construction. The spokes 3 are connected at their outer ends to the rim or felly 1 and are provided with enlarged and laterally extended bases 4 which are received in a channeled hub 5, the said hub 5 being provided with side flanges 6 between which the bases of the spokes are received, as shown in Fig. 3.

Arranged upon the inner side of the hub 5 are parallel tracks 7 and 8 and in the preferred embodiment of the invention, one of said tracks 8 is fixed or stationary relative to the hub 5 while the other track 7 is made removable for the purpose of assisting in the assembling of the different parts of the wheel as a whole. By reference to Fig. 3, it will be seen that the track 7 is provided with a marginal flange 9 which is secured to the hub 5 by means of bolts 10 which also pass through the enlarged inner ends of the spokes thus securely holding all parts together.

In addition to the parts above enumerated, the hub 5 comprises the oppositely arranged side plates 11 and these plates may be secured to the flanges 6 of the hub 5 by the same bolts 10 above referred to. All parts of the hub 5, spokes, and felly herein above referred to are rigidly connected together so as to move as a unit relatively to the inner hub next to the axle to be described.

The inner hub 12 which is next to the axle is provided intermediate its ends with a collar 13, which in the preferred embodiment of the invention is provided with a circular series of threaded sockets 14 adapted to receive the threaded inner ends 15 of a series of radial arms 16, one of which is shown in detail in Fig. 4. These arms are preferably square in cross section as shown in Fig. 4 and adjacent to their inner ends they are provided with shoulders 17 adapted to bear against the collar 13 on the hub 12 when screwed up tightly against the same. Each shoulder 17 is provided in its periphery with a spring socket 18 which is adapted to receive the inner terminal of a coiled spring 19, thus preventing the spring from rattling. The springs 19 encircle the arms 16 and the outer ends of said springs are received between the flanges 20 of runners 21, one of which is illustrated in detail in Fig. 5. The body 22 of each runner is provided with a square opening 23 adapted to permit the squared arm 16 to slide freely therethrough and on its outer side each runner is provided with rollers 24 which are adapted to roll and travel in contact with the inner edges of the tracks 7 and 8, above described, while permitting the projecting ends of the arms 16 to move between and in contact with the inner surface of the tracks 7 and 8 as clearly indicated in Fig. 3, thus preventing lateral movement. By squaring the arms 16 in cross section, said arms are prevented from turning on the hub and they also prevent the runners 21 from turning on the arms, thus keeping all of the parts perfect in alinement. The hub 12 also comprises preferably the oppositely arranged inner side plates 25 which as shown in Fig. 3, overlap the outer side plates 11 sufficiently to admit of a large amount of relative play between the inner and outer hubs while inclosing, concealing and protecting the springs and arms and runners located between the plates. The plates referred to also exclude dirt and other foreign matter and keep the working parts of the wheel in perfect condition. The inner side plates 25 are secured to and move with the hub 12 and form a part of the hub 12 of the wheel.

From the foregoing description, it will be seen that the two hubs of the wheel are capable of free relative rotative movement as well as sliding movement between the tracks or in the plane of the wheel as a whole, and that said wheel hubs are sustained in concentric relation to e..'.- by the circular series of springs under the arrangement described, the said springs enabling one hub 5 of the wheel to slide relatively to the other hub 12 while any relative lateral movement of the hubs is prevented. A thoroughly braced wheel is the result.

Instead of making the tracks 7 and 8 continuous from their inner to the outer peripheries, each of said tracks may be constructed as shown in Fig. 6, where it will be observed that the track is cut away to leave radial attaching extensions 26 which extend from the track proper outward to the hub 5, to which they may be secured in any convenient manner. One of the tracks may be formed as an integral part of the hub 5, as shown in Fig. 3, or if desired, both of the tracks 7' and 8' may be formed as an integral part of the hub 5', as shown in Fig. 8. It is also within the scope of this invention to form each of the tracks 7 and 8 separate from each other and also separate from the hub 5', as shown at 26', 26'' in Fig. 10.

When the tracks 7' and 8' are formed integrally with the hub 5', the structure may be provided at one side with a removable section 27 as shown in Figs. 7 and 9, so that by removing said section, the arms 16 and the runners 21 and the springs 19 may be applied one at a time to the hub 12 and after all of said parts are in place and the construction of the hub 12 is completed, the removable section 27 may be replaced and secured by one of the bolts 10 above referred to and as indicated in Fig. 7.

It will be seen that the wheel as a whole comprises an inner hub 12 adapted to revolve freely on an axle in either direction, and an outer hub 5 fixed to the rim or felly and mounted to revolve freely and completely in either direction around the inner hub 12, means for holding the inner hub 12 and the outer hub 5 laterally braced relatively to each other without being attached to one another while permitting such relative rotative movement.

While I have shown and described the wheel in the preferred embodiment thereof, it will, of course, be understood that the general design of the wheel may be changed; also that various changes may be made in the form, proportion and minor details of construction of the wheel without departing from the principle or sacrificing any of the advantages of the invention.

I claim:—

1. A wheel comprising an outer hub, an inner hub free to rotate relatively to the outer hub, parallel tracks carried by one hub, arms carried by the other hub and working between said tracks, and coiled springs encircling said arms operating to yieldingly sustain the hubs in concentric relation.

2. A wheel comprising an outer hub, an inner hub free to rotate relatively to the outer hub, parallel tracks carried by one hub, arms carried by the other hub, and coiled springs encircling said arms operating to yieldingly sustain the hubs in concentric relation, said arms being adapted to work outward and inward and to slide circumferentially of and between the tracks.

3. A wheel comprising an outer hub, an inner hub free to rotate relatively to the outer hub, parallel tracks carried by one hub, arms carried by the other hub, springs on said arms operating to yieldingly sustain the hubs in concentric relation, and runners movable along said tracks and through which the arms slide.

4. A wheel comprising an outer hub, an inner hub free to rotate relatively to the outer hub, parallel tracks carried by one hub, arms carried by the other hub, springs on said arms operating to yieldingly sustain the hubs in concentric relation, and runners through which said arms slide and against which the springs rest, said runners being provided with rollers adapted to travel in contact with said tracks.

In testimony whereof I affix my signature in presence of two witnesses.

JOSIAH H. HARVEY.

Witnesses:
REXFORD M. SMITH.
E. H. PARKINS.